United States Patent
Kim et al.

(10) Patent No.: US 12,160,016 B2
(45) Date of Patent: Dec. 3, 2024

(54) SECONDARY BATTERY

(71) Applicant: Samsung Electronics Co., Ltd., Suwon-si (KR)

(72) Inventors: Kyounghwan Kim, Seoul (KR); Hwiyeol Park, Hwaseong-si (KR); Joungwon Park, Seongnam-si (KR); Jeongkuk Shon, Hwaseong-si (KR); Junhyeong Lee, Seoul (KR); Huisu Jeong, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 257 days.

(21) Appl. No.: 17/523,072

(22) Filed: Nov. 10, 2021

(65) Prior Publication Data

US 2022/0166110 A1     May 26, 2022

(30) Foreign Application Priority Data

Nov. 20, 2020  (KR) .................. 10-2020-0156924

(51) Int. Cl.
*H01M 50/457* (2021.01)
*H01M 4/02* (2006.01)
(Continued)

(52) U.S. Cl.
CPC .... *H01M 50/457* (2021.01); *H01M 2004/028* (2013.01); *H01M 4/505* (2013.01); *H01M 4/525* (2013.01); *H01M 4/5825* (2013.01)

(58) Field of Classification Search
CPC .... H01M 50/457; H01M 4/505; H01M 4/525; H01M 4/5825; H01M 2004/028;
(Continued)

(56) References Cited

U.S. PATENT DOCUMENTS

| 6,383,678 B1 | 5/2002 | Kaneko et al. |
| 8,778,524 B2 * | 7/2014 | Lee .................. H01M 50/457 |
| | | 429/142 |

(Continued)

FOREIGN PATENT DOCUMENTS

| JP | H08180853 A | 7/1996 |
| JP | 3997660 B2 | 10/2007 |
| KR | 101889730 B1 | 8/2018 |
| KR | 1020180125142 A | 11/2018 |

OTHER PUBLICATIONS

Extended European Search Report issued in EP Patent Application No. 21208151.7, dated Apr. 19, 2022, 10 pp.

*Primary Examiner* — Jonathan G Jelsma
*Assistant Examiner* — Omar M Kekia
(74) *Attorney, Agent, or Firm* — CANTOR COLBURN LLP

(57) ABSTRACT

A secondary battery includes a negative electrode; a positive electrode including a plurality of positive electrode plates spaced apart from each other in a width direction, wherein a positive electrode plate of the plurality of positive electrode plates has a planar shape, and a channel between the plurality of positive electrode plates; an electrolyte material disposed in the channel between the plurality of positive electrode plates; a separation membrane between the negative electrode and the positive electrode; and a first metal layer disposed on a surface of the separation membrane facing the positive electrode.

29 Claims, 12 Drawing Sheets

(51) Int. Cl.
*H01M 4/505* (2010.01)
*H01M 4/525* (2010.01)
*H01M 4/58* (2010.01)

(58) Field of Classification Search
CPC ......... H01M 10/0525; H01M 10/0566; H01M 50/417; H01M 50/431; H01M 2004/021; H01M 4/043; H01M 4/0471; H01M 4/131; H01M 4/1391; H01M 50/451; H01M 4/0404; H01M 4/13; H01M 10/058; H01M 4/136; H01M 4/62; H01M 4/661; H01M 4/666; H01M 4/70; H01M 10/052
USPC .......................................................... 429/11
See application file for complete search history.

(56) References Cited

U.S. PATENT DOCUMENTS

| | | | |
|---|---|---|---|
| 9,337,462 B2* | 5/2016 | Pfleging | H01M 4/13 |
| 10,559,800 B2 | 2/2020 | Kagami et al. | |
| 2001/0041294 A1* | 11/2001 | Chu | H01M 4/12 429/231.95 |
| 2004/0241540 A1* | 12/2004 | Tsutsumi | H01M 10/0459 429/157 |
| 2014/0315066 A1 | 10/2014 | Pfleging et al. | |
| 2015/0056485 A1* | 2/2015 | Kang | H01M 10/058 429/94 |
| 2017/0025658 A1* | 1/2017 | Shi | C23C 14/20 |
| 2020/0144608 A1* | 5/2020 | Jeong | H01M 4/043 |
| 2020/0194773 A1 | 6/2020 | Zankowski et al. | |

\* cited by examiner

SECONDARY BATTERY

CROSS-REFERENCE TO RELATED APPLICATION

This application is based on and claims priority to Korean Patent Application No. 10-2020-0156924, filed on Nov. 20, 2020, in the Korean Intellectual Property Office, and all the benefits accruing therefrom under 35 U.S.C. § 119, the content of which in its entirety is herein incorporated by reference.

BACKGROUND

1. Field

The present disclosure relates to a secondary battery and a method of making the secondary battery.

2. Description of the Related Art

A secondary battery refers to a battery capable of both charge and discharge, unlike a primary battery that cannot be charged. A secondary battery is used as a power source in various electronic devices such as mobile phones, notebook computers, and camcorders. In particular, a lithium secondary battery has advantages of higher voltage and higher energy density per unit weight than a nickel-cadmium battery or a nickel-hydrogen battery, and thus there is an increased demand for the lithium secondary batteries.

As the type of electronic device to which the secondary battery are applied has diversified, and as the market has grown, there is an increased demand to improve/increase various aspects of secondary battery performance, such as energy density, rate capability, stability, durability, and flexibility. The energy density of a secondary battery is related to the increase in the capacity of the secondary battery, while the rate capability of the secondary battery is related to the charging speed of a secondary battery.

SUMMARY

Provided is a secondary battery in which lithium ions and electrons may be move uniformly within the secondary battery by including a positive electrode layer having a three-dimensional shape.

In addition, also provided is a secondary battery with improved rate capability and increased capacity.

Also provided is a secondary battery having improved life by preventing deterioration of the secondary battery.

Additional aspects will be set forth in part in the description which follows and, in part, will be apparent from the description, or may be learned by practice of the presented embodiments of the disclosure.

According to an aspect, a secondary battery includes a negative electrode; a positive electrode including a plurality of positive electrode plates spaced apart from each other in a width direction, wherein a positive electrode plate of the plurality of positive electrode plates has a planar shape, and a channel between the plurality of positive electrode plates; an electrolyte material disposed in the channel formed between the plurality of positive electrode plates; an electrolyte material disposed in the channel between the plurality of positive electrode plates; a separation membrane between the negative electrode and the plurality of positive electrode plates; and a first metal layer on a of the separation membrane facing the positive electrode.

The first metal layer may include aluminum (Al), nickel (Ni), copper (Cu), silver (Ag), zinc (Zn), tin (Sn), gold (Au), poly (3,4-ethylenedioxythiophene):poly (styrene sulfonate) (PEDOT:PSS), polyaniline (PANI), polypyrrole (PPy), polythiophene (PTh) functionalized with a carboxylate-containing polymer (e.g., polyacrylic acid (PAA), carboxymethylcellulose (CMC), sodium carboxymethyl chitosan (CCTS), sodium alginate (SA)), or a combination thereof.

The first metal layer may have a thickness of about 5 nanometers (nm) to about 500 nm.

The positive electrode of the secondary battery may further include a base layer to which a first end of each positive electrode plate of the plurality of positive electrode plates is attached, and wherein the plurality of positive electrode plates may be spaced apart from each other at a predetermined interval on an upper surface of the base layer.

The base layer may include a first positive active material, and the plurality of positive electrode plates may include a second positive active material.

The first positive active material and the second positive active material may be the same or different.

The plurality of positive electrode plates may include a porous structure having a plurality of pores therein.

The plurality of positive electrode plates may include $LiCoO_2$ (LCO), $Li(Ni,Co,Mn)O_2$ (NCM), $Li(Ni,Co,Al)O_2$ (NCA), $LiMn_2O_4$ (LMO), $LiFePO_4$ (LFP), or a combination thereof.

The secondary battery may further include a protective layer between the separation membrane and the first metal layer.

The protective layer may include Al, Si, Ti, Zr, Sn, Mg, Ca, or a combination thereof.

The secondary battery may further include a positive electrode current collecting layer facing a second end of each positive electrode plate of the plurality of positive electrode plates, and a negative electrode current collecting layer facing a surface of the negative electrode and facing the positive electrode current collecting layer.

In an aspect, a secondary battery includes a negative electrode; a positive electrode comprising a plurality of positive electrode plates spaced apart from each other in a width direction, wherein a positive electrode plate of the plurality of positive electrode plates has a planar shape and a channel between the plurality of plates; an electrolyte material disposed in the channel between the plurality of positive electrode plates; a separation membrane between the negative electrode and the positive electrode; a first metal layer disposed on a surface of the separation membrane facing the positive electrode; and a second metal layer between the negative electrode and the separation membrane.

The second metal layer may include a lithium metal and may have a film shape.

The second metal layer may have a thickness of about 50 nm to about 10 µm.

The first metal layer may include aluminum (Al), nickel (Ni), copper (Cu), silver (Ag), zinc (Zn), tin (Sn), gold (Au), poly (3,4-ethylenedioxythiophene):poly (styrene sulfonate) (PEDOT:PSS), polyaniline (PANI), polypyrrole (PPy), polythiophene (PTh) functionalized with a carboxylate-containing polymer, or a combination thereof.

The first metal layer may have a thickness of about 5 nm to about 500 nm or less.

The positive electrode may further include a base layer to which a first end of each positive electrode plate of the plurality of positive electrode plates is attached, and the plurality of positive electrode plates may be spaced apart from each other at a predetermined interval on an upper surface of the base layer.

The base layer may include a first positive active material, and the plurality of positive electrode plates may include a second positive material.

The first positive active material and the second positive active material may be the same or different.

The plurality of positive electrode plates may include a porous structure having a plurality of pores therein.

The plurality of positive electrode plates may include $LiCoO_2$ (LCO), $Li(Ni,Co,Mn)O_2$ (NCM), $Li(Ni,Co,Al)O_2$ (NCA), $LiMn_2O_4$ (LMO), $LiFePO_4$ (LFP), or a combination thereof.

The secondary battery may further include a positive electrode current collecting layer facing a second end of each positive electrode plate of the plurality of positive electrode plates, and a negative electrode current collecting layer facing a surface of the negative electrode and facing the positive electrode current collecting layer.

According to an aspect of another embodiment, a secondary battery includes a negative electrode; a positive electrode including a plurality of positive electrode plates spaced apart from each other in a width direction, wherein a positive electrode plate of the plurality of positive electrode plates has a planar shape; an electrolyte material disposed between the plurality of positive electrode plates; a separation membrane between the negative electrode and the positive electrode; and a metal layer between the negative electrode and the separation membrane.

The metal layer may include a lithium metal layer of thin film shape.

The metal layer may have a thickness of about 50 nm to about 10 μm.

The secondary battery may further include a base layer to which a first end of each positive electrode plate of the plurality of positive electrode plates is attached, and wherein the plurality of positive electrode plates may be spaced apart from each other at a predetermined interval on an upper surface of the base layer.

The base layer may include a first positive active material, and the plurality of positive electrode plates may include a second positive active material.

The first positive active material and the second positive active material may be the same or different.

The plurality of positive electrode plates may include a porous structure having a plurality of pores therein.

The plurality of positive electrode plates may include $LiCoO_2$ (LCO), $Li(Ni,Co,Mn)O_2$ (NCM), $Li(Ni,Co,Al)O_2$ (NCA), $LiMn_2O_4$ (LMO), $LiFePO_4$ (LFP), or a combination thereof.

The secondary battery may further include a positive electrode current collecting layer facing a second end of each positive electrode plate of the plurality of positive electrode plates, and a negative electrode current collecting layer facing a surface of the negative electrode and facing the positive electrode current collecting layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
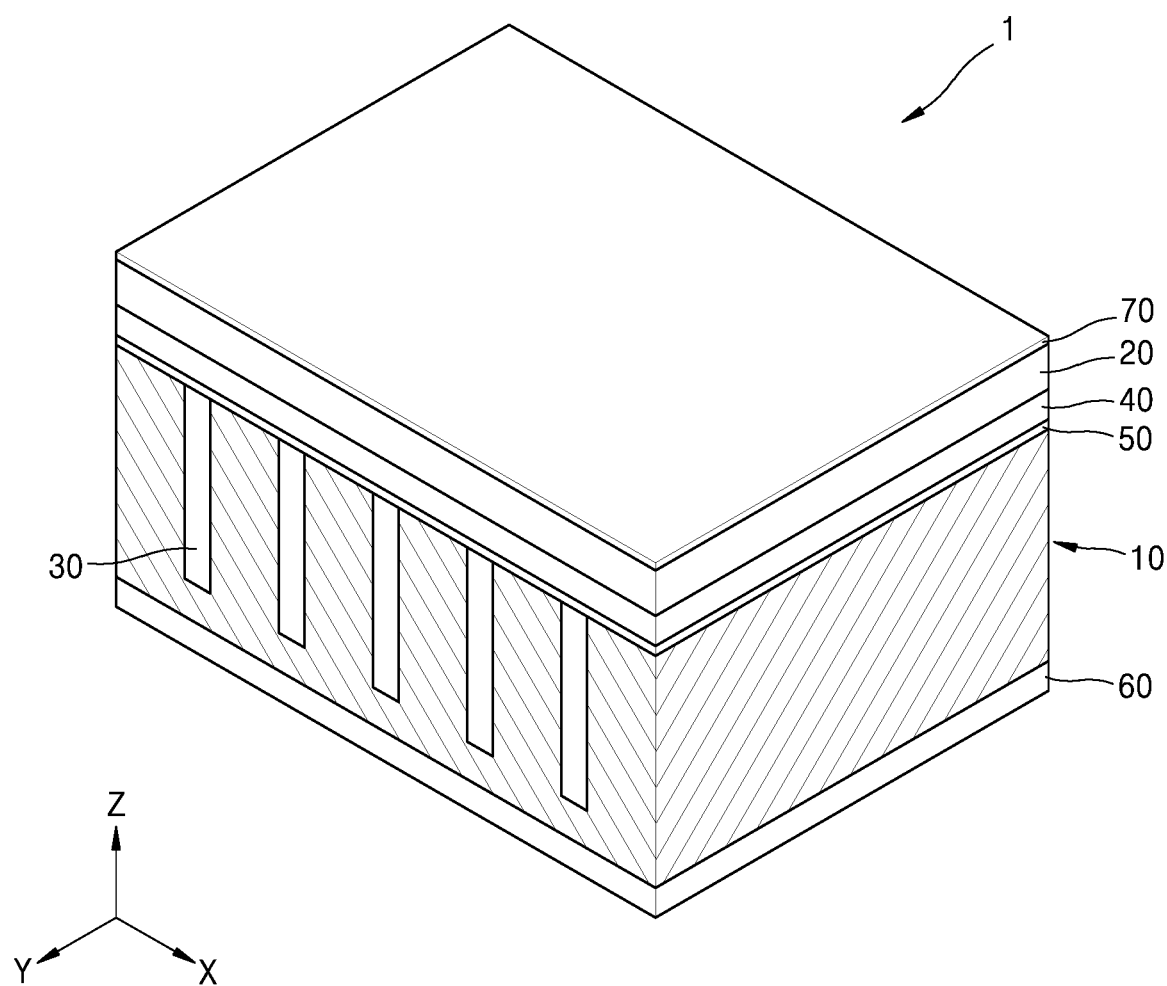
FIG. 1 is a perspective view of a secondary battery, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The C rate is a discharge rate of a cell, and is obtained by dividing a total capacity of the cell by a total discharge period of time, e.g., a C rate for a battery having a discharge capacity of 1.6 ampere-hours would be 1.6 amperes.

Hereinafter, a secondary battery according to example embodiments will be described in detail with reference to the accompanying drawings. The width and thickness of layers or regions shown in the accompanying drawings may be exaggerated somewhat for clarity of the specification and convenience of description.

Figure 2A:
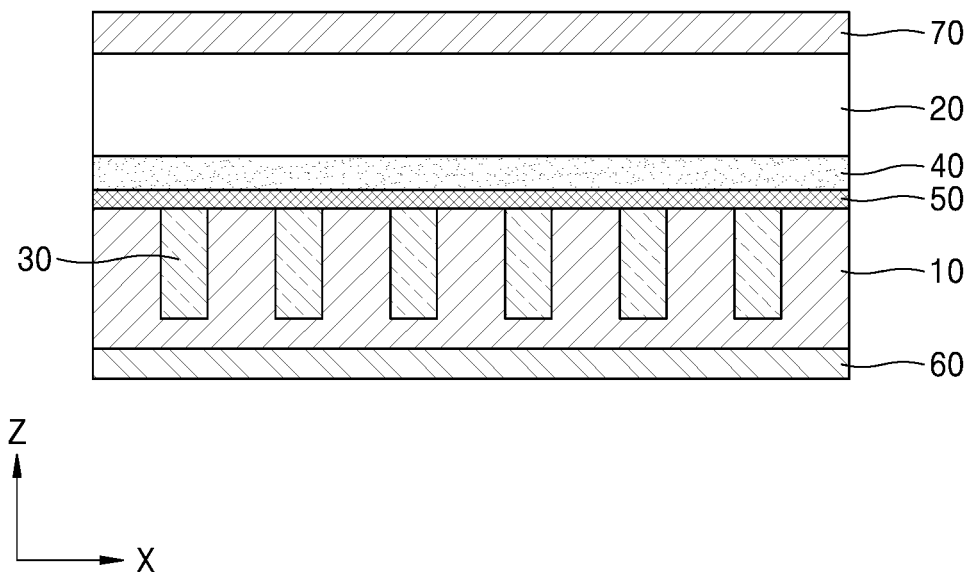
FIG. 2A is a cross-sectional view of a secondary battery, according to an embodiment.
Figure 2B:
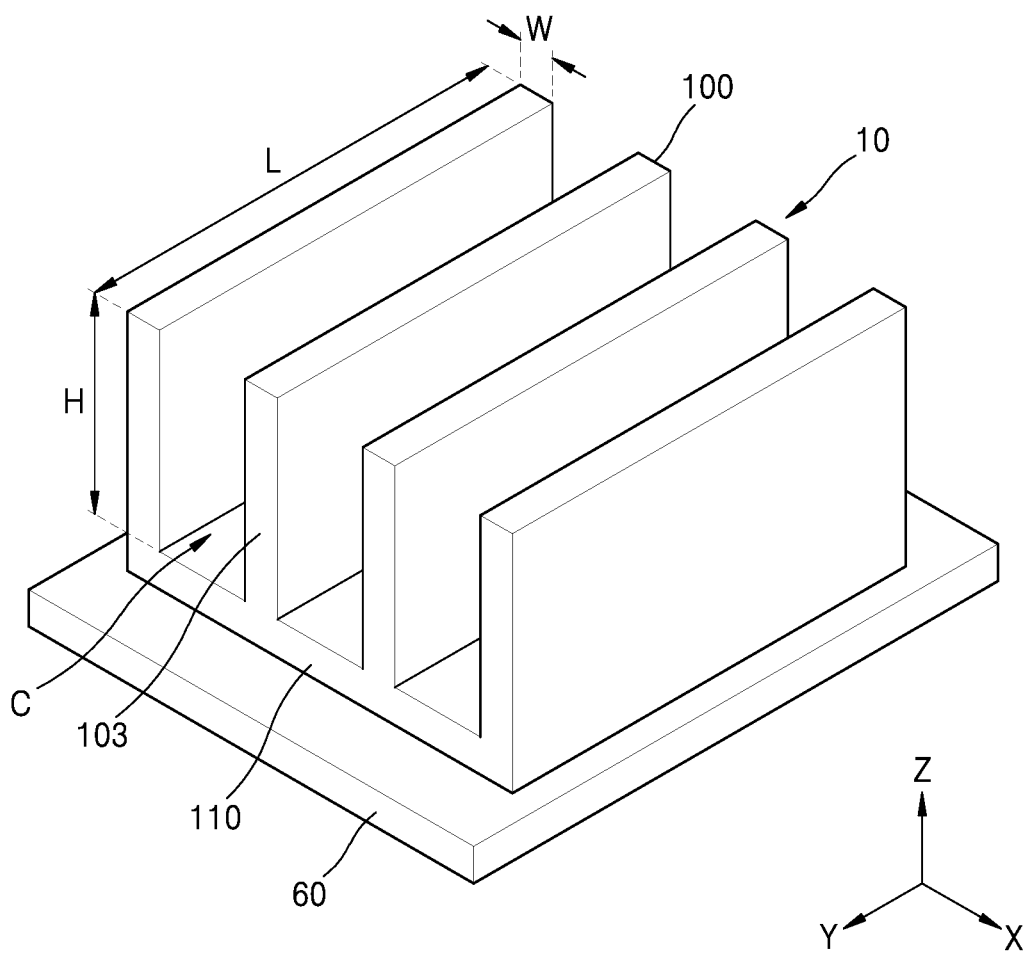
FIG. 2B is a perspective view of a positive electrode and a positive electrode current collecting layer, according to an embodiment.

FIG. 1 is a perspective view of a secondary battery according to an embodiment. FIG. 2A is a cross-sectional view of a secondary battery according to an embodiment. FIG. 2B is a perspective view of a positive electrode and a positive electrode current collecting layer according to an embodiment.

In FIGS. 1, 2A, and 2B, a secondary battery 1 according to an embodiment may include a positive electrode 10, a negative electrode 20, an electrolyte material 30, a separation membrane 40 disposed between the positive electrode 10 and the negative electrode 20, a first metal layer 50 disposed between the positive electrode 10 and the separation membrane 40, a positive electrode current collecting layer 60, and a negative electrode current collecting layer 70.

As shown in FIG. 2B, the positive electrode 10 according to an embodiment may have a three-dimensional shape. In particular, the positive electrode 10 may include a positive electrode plate 100 and a base layer 110, and more specifically, may include a plurality of positive electrode plates 100 and a base layer 110. The base layer 110 may be disposed on a surface of the positive electrode current collecting layer 60 to be described later. The three-dimensional shape of the positive electrode 10 may be defined in a width direction, a length direction, and a height direction. In an embodiment, the plurality of positive electrode plates 100 and the base layer 110 included in the positive electrode 10 may be defined in a width direction, a length direction, and a height direction, and the width direction, the length direction, and the height direction are indicated in FIGS. 1 and 2B as an x-axis direction, a y-axis direction, and a z-axis direction, respectively.

The base layer 110 may include a first positive active material. In addition, a first end of each positive electrode plate of the plurality of positive electrode plates is attached to the base layer 110. As a result, the base layer 110 may interconnect first ends of the plurality of positive electrode plates 100. For example, the plurality of positive electrode plates 100 may be disposed on an upper surface of the base layer 110 and are spaced apart from each other at a predetermined interval. The plurality of positive electrode plates 100 according to an embodiment may include a positive active material, which is the same as the first positive active material of the base layer 110 or may include a second active material which is different from the first positive active material of the base layer 110. Here, the first and second positive active materials may be the same material or different materials. The first and second positive active materials may include, for example, LiCoO$_2$ (LCO), Li(Ni$_{1-x-y}$Co$_x$Mn$_y$)O$_2$ wherein 0<x<1 and 0<y<1 (NCM), Li(Ni$_{1-x-y}$Co$_x$Al$_y$)O$_2$ wherein 0<x<1 and 0<y<1 (NCA), LiMn$_2$O$_4$ (LMO), LiFePO$_4$ (LFP), or a combination thereof. However, the first and second positive active materials are not limited thereto.

The base layer 110 according to an embodiment may have a relatively low active material density compared to the positive electrode plate 100. Since the base layer 110 may be manufactured through a sintering process, the base layer 110 may not contain a binder, a conductive material, or a combination thereof. When the base layer 110 is composed of a porous material having a low active material density, pores in the base layer 110 may be filled with an electrolyte material 30, to be described later. In addition, for example, the base layer 110 may have a height of about 5 micrometers (μm) to about 200 μm, or about 10 μm to about 150 μm, or about 20 μm to about 125 μm. However, the height of the base layer 110 is not limited thereto.

The base layer 110 may include a composite of the first positive active material and a conductive metal. Here, the conductive metal may include, for example, Al, Cu, Ni, Co, Cr, W, Mo, Ag, Au, Pt, Pd, or a combination thereof, but is not limited thereto.

The plurality of positive electrode plates 100 may have a relatively greater active material density compared to the base layer 110.

Since the plurality of positive electrode plates 100 according to an embodiment may be manufactured through a sintering process, a binder, a conductive material, or a combination thereof may not be included in the plurality of positive electrode plates 100. The plurality of positive electrode plates 100 may disposed on and extend from the upper surface of the base layer 110 and are spaced apart from each other, thereby forming the positive electrode 10 having a three-dimensional structure. The plurality of positive electrode plates 100 may be on the upper surface of the base layer 110 to be spaced apart from each other at a predetermined interval in the width direction (the x-axis direction) of the base layer 110. For example, the plurality of positive electrode plates 100 may be spaced apart from each other, for example, at an interval of greater than 0 to about 50 μm, or about 1 μm to about 50 μm, or about 5 μm to about 30 μm, in the width direction (the x-axis direction). The plurality of positive electrode plates 100 may be disposed substantially vertically with respect to the upper surface of the base layer 110, but is not limited thereto. For example, the plurality of positive electrode plates 100 may be parallel to one another and may be disposed perpendicular to the upper surface of the base layer 110.

The plurality of positive electrode plates 100 may have an aspect ratio greater than 1, or greater than 2, or greater than 10, or greater than 50, respectively. That is, the positive electrode plate 100 may have a height H greater than a width W. For example, the width W of the positive electrode plate 100 may be about 10 μm or greater, and the height H of the positive electrode plate 100 may be about 20 μm to about 1000 μm, or about 50 μm to about 1000 μm or about 100 μm to about 1000 μm. However, the present disclosure is not limited thereto, and the width W and height H of the positive electrode plate 100 may be variously modified to provide an aspect ratio greater than 1. The plurality of positive electrode plates 100 may each have the same length L. However, the present disclosure is not limited thereto, and at least one positive electrode plate of the plurality of positive electrode plates 100 may have a different length.

As described above, the plurality of positive electrode plates 100 may be disposed on and extend from the upper surface of the base layer 110 and are spaced apart from each other at a predetermined interval, so that a channel C may be present between adjacent positive electrode plates amongst the plurality of positive electrode plates 100. As shown in FIG. 2B, the positive electrode may include a plurality of channels C between the plurality of positive electrode plates 100. The width and shape of the channel C is defined by surfaces of adjacent positive electrode plates. Herein, the channel C may have a constant width corresponding to the distance of the interval between the plurality of positive electrode plates 100. The channel C may extend to a predetermined depth in the base layer 110 between the plurality of positive electrode plates 100. The depth of the channel C may be variously modified.

The channel C formed between the plurality of positive electrode plates 100 may be filled with the electrolyte material 30 of the secondary battery. According to an embodiment, the electrolyte material may be disposed in the channel between the plurality of positive electrode plates. For example, the electrolyte material 30 may be a liquid electrolyte, and thus, the channel C and pores in the base layer 110 connected to the channel C may be filled with the electrolyte. In an embodiment, the electrolyte material 30 may include, for example, a lithium salt and an organic solvent. The lithium salt is not limited and any lithium salt suitable for use as the electrolyte for a lithium secondary battery may be used, without limitation. The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, gamma-butyrolactone, propylene sulfite, tetrahydrofuran, or a combination thereof.

In the positive electrode 10 according to an embodiment, the plurality of positive electrode plates 100 and the base layer 110 may be formed through sintering process. Accordingly, the plurality of positive electrode plates 100 and the base layer 110 may not include a binder for binding the positive active material, and/or a conductive material (which is generally present to improve electrical conductivity lowered due to the binder). In addition, by forming a positive electrode having the three-dimensional structure in which the plurality of positive electrode plates 100 are disposed spaced apart from each other on the surface of the base layer 110, and by placing the electrolyte material 30 having high ionic conductivity in the channel C, the ionic conductivity of the positive electrode may be increased. When the ion conductivity is increased, the height of the plurality of positive electrode plates 100 may also be increased, so that the current density may be increased.

Referring back to FIGS. 1 and 2A, the negative electrode 20 may have a flat plate shape. The negative electrode 20 may include a negative electrode active material that is capable of reversibly incorporating/deincorporating lithium ions. The negative electrode active material according to an embodiment may include lithium metal, a lithium metal alloy, a material capable of doping and undoping lithium, a transition metal oxide, or a combination thereof, but is not limited thereto. For example, the negative electrode active material may include at least one negative electrode composition including the negative electrode active material, such as the lithium metal, the lithium metal alloy, the material capable of doping and undoping lithium, the transition metal oxide, or a combination thereof. The negative electrode composition for forming the negative electrode 20 according to an embodiment may further include a binder, a conductive material, a thickener, or a combination thereof, in addition to the negative electrode active material.

The separation membrane 40 may separate the positive electrode 10 and the negative electrode 20 and provide a path for the movement of lithium ions. The separation membrane 40 is no limited any separation membrane suitable for a lithium secondary battery may be used. That is, any separation membrane 40 having low resistance to lithium ion movement in the electrolyte, and having excellent electrolyte-moisturizing ability, may be used. For example, the separation membrane 40 may be include glass fiber, polyester, polyethylene (PE), polypropylene (PP), polytetrafluoroethylene (PTFE), or a combination thereof. The separation membrane 40 may be a non-woven fabric or a woven fabric. In particular, a polyolefin-based polymer separation membrane, such as polyethylene, polypropylene, may be used. The separation membrane may be a coated separation membrane containing a coating including a ceramic component or a polymer material, and may also be used to secure heat resistance or mechanical strength. The separation membrane may be a single-layer structure or a multi-layer structure.

The first metal layer 50 may be disposed on a surface of the separation membrane 40 that faces the positive electrode 10 including the plurality of positive electrode plates 100. The first metal layer 50 according to an embodiment may be deposited on the surface of the separation membrane 40 using a deposition process, for example, a sputtering process. However, the present disclosure is not limited thereto, and any process in which the first metal layer 50 is disposed on the surface of the separation membrane 40 may be used.

The first metal layer 50 disposed on the surface of the separation membrane 40 may be disposed to face the positive electrode 10, and thus faces the plurality of positive electrode plates 100 and the electrolyte material 30. As an example, some regions of the surface of the first metal layer 50 facing the positive electrode 10 may be disposed to contact an end of each of the plurality of positive electrode plates 100. In addition, the regions of the surface of the first metal layer 50 that do not contact the ends of the plurality of positive electrode plates 100 may be disposed to contact the electrolyte material 30 disposed in the channel C. Accordingly, without being limited by theory, metal ions, for example, lithium ions (Li+) moving between the positive electrode 10 and the negative electrode 20 may be dispersed and moved along a surface of the first metal layer 50. Accordingly, uniform distribution of the current may be achieved and thus the rate capability may be prevented from being deteriorated. The technical characteristics of dispersing and moving lithium ions (Li+) using the first metal layer 50 will be described later with reference to FIGS. 3A to 4B.

The first metal layer 50 according to an embodiment may include a conductive material through which metal ions, for example, lithium ions (Li+) may move. As an embodiment, the first metal layer 50 may include aluminum (Al), nickel (Ni), copper (Cu), silver (Ag), zinc (Zn), tin (Sn), gold (Au), or a combination thereof. However, the material included in the first metal layer 50 is not limited thereto. For convenience of description, a conductive layer of lithium ions (Li$^+$) disposed on the surface of the separation membrane 40 is referred to herein as a first metal layer 50. The first metal layer 50 may further include a conductive polymer material having a high conductivity except for metal, such as poly (3,4-ethylenedioxythiophene):poly(styrene sulfonate) (PEDOT:PSS), polyaniline (PANI), polypyrrole (PPy), polythiophene (Pth) functionalized with a carboxylate-containing polymer or a combination thereof. Examples of carboxylate-containing polymers include polyacrylic acid (PAA), carboxymethylcellulose (CMC), sodium carboxymethyl chitosan (CCTS), and sodium alginate (SA)). In addition, the first metal layer 50 may have a predetermined thickness in which the conductivity of lithium ions (Li+) is not decreased. For example, the first metal layer 50 may have a thickness of 5 nm to about 500 nm, or about 10 nm to about 400 nm, or about 25 nm to about 250 nm, but the present disclosure is not limited thereto.

The positive electrode current collecting layer 60 may have a plate shape, and in this case, the positive electrode current collecting layer 60 may be referred to as a current collecting plate. The positive electrode current collecting layer 60, according to an embodiment, may be disposed to face ends of the plurality of positive electrode plates 100 that are not attached to the base plate. In an embodiment, when the positive electrode 10 includes the base layer 110 connecting the plurality of positive electrode plates 100, the positive electrode current collecting layer 60 may be disposed to face a surface of the base layer 110. The positive electrode current collecting layer 60 may include, for example, a conductive materials composed of Cu, Au, Pt, Ag, Zn, Al, Mg, Ti, Fe, Co, Ni, Ge, In, Pd, or a combination thereof. The positive electrode current collecting layer 60 may include a metal layer, or may include a conductive material other than a metal.

The negative electrode current collecting layer 70 may be disposed to face a surface of the negative electrode 20 and may be electrically connected to the negative electrode 20. In this case, the negative electrode current collecting layer 70 may also be disposed to face the positive electrode current collecting layer 60. The negative electrode current collecting layer 70, according to an embodiment, may be a copper foil, a nickel foil, a stainless steel foil, a titanium foil, a nickel foam, a copper foam, a polymer substrate coated with a conductive metal, or a combination thereof, but is not limited thereto.

As described above, when the secondary battery 1 includes a positive electrode 10 having the three-dimensional structure, in which the plurality of positive electrode plates 100 are disposed perpendicular to, or substantially perpendicular to, the positive electrode current collecting layer 60, the capacity and energy density of the secondary battery 1 may be greatly increased compared to a secondary battery having a positive electrode having a two-dimensional structure (i.e., a planar-type structure). Since the three-dimensional positive electrode 10 may secure a high active material volume fraction and a wide reaction area compared to a planar-type positive electrode, the three-dimensional positive electrode 10 may be advantageous in improving the energy density and the rate capability of the secondary battery.

However, in a case of sintering a positive active material having a high density, which is included in the plurality of positive electrode plates 100 to increase the capacity of the secondary battery 1, the ionic conductivity of the plurality of positive electrode plates 100 may decrease, and thus the energy density and rate capability of the secondary battery 1 may be reduced. The electrolyte material 30 having high ionic conductivity, and disposed in the channel C, prevents deterioration in the energy density and the rate capability of the secondary battery 1. However, when an object in direct contact with the separation membrane 40 includes the ends of the plurality of positive electrode plates 100 and the electrolyte material 30, lithium ions (Li$^+$) and electrons (e$^-$) may be concentrated at the ends of the plurality of positive electrode plates 100. The first metal layer 50 may be disposed to prevent the concentration of lithium ions (Li$^+$) and electrons (e$^-$). Hereinafter, and without being limited by theory, the dispersion movement of lithium ions (Li$^+$) and electrons (e$^-$) according to the arrangement of the first metal layer 50 will be described.

Figure 3A:
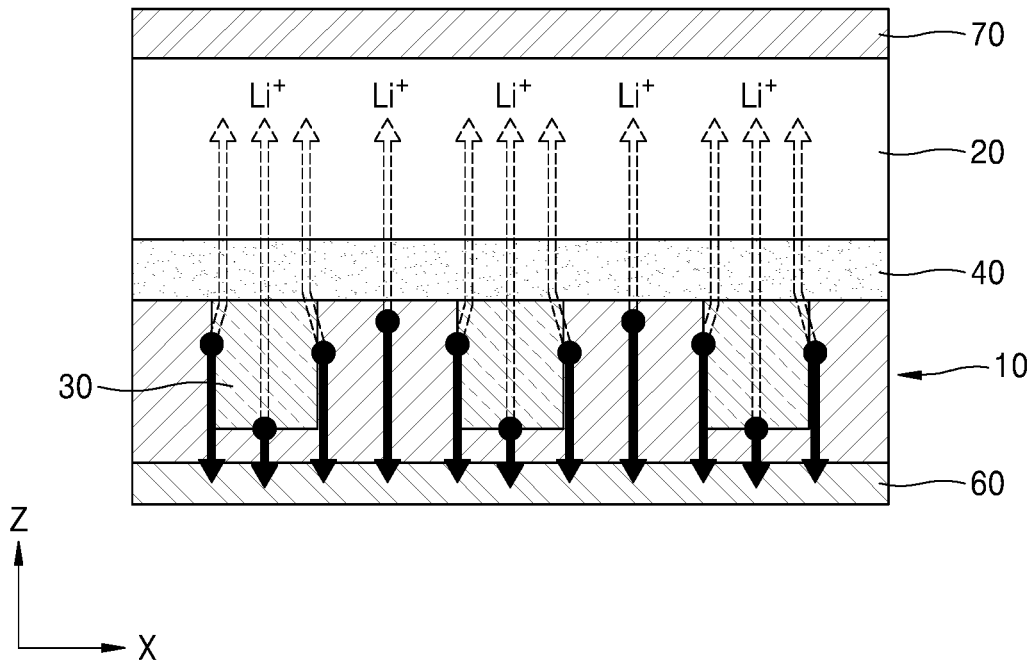
FIG. 3A is a cross-sectional view of a secondary battery illustrating the movement of lithium ions (Li+) and electrons (e−) during initial charging of a lithium secondary battery manufactured according to a comparative example.
Figure 3B:
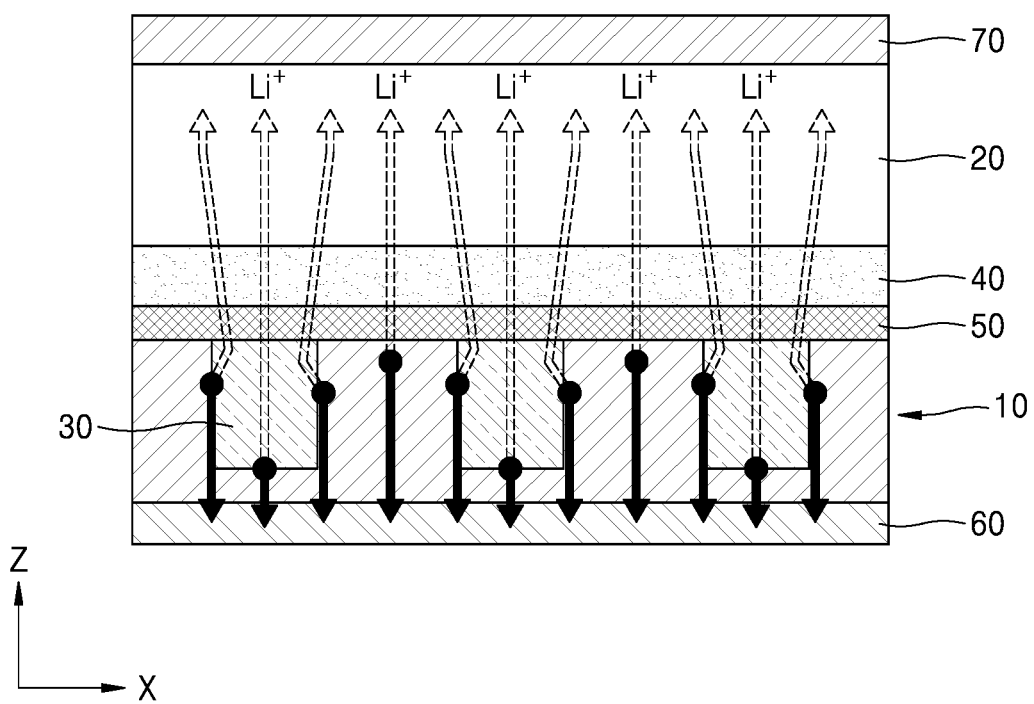
FIG. 3B is a cross-sectional view of a secondary battery illustrating the movement of lithium ions (Li+) and electrons (e−) during initial charging of a lithium secondary battery manufactured according to an embodiment.
Figure 4A:
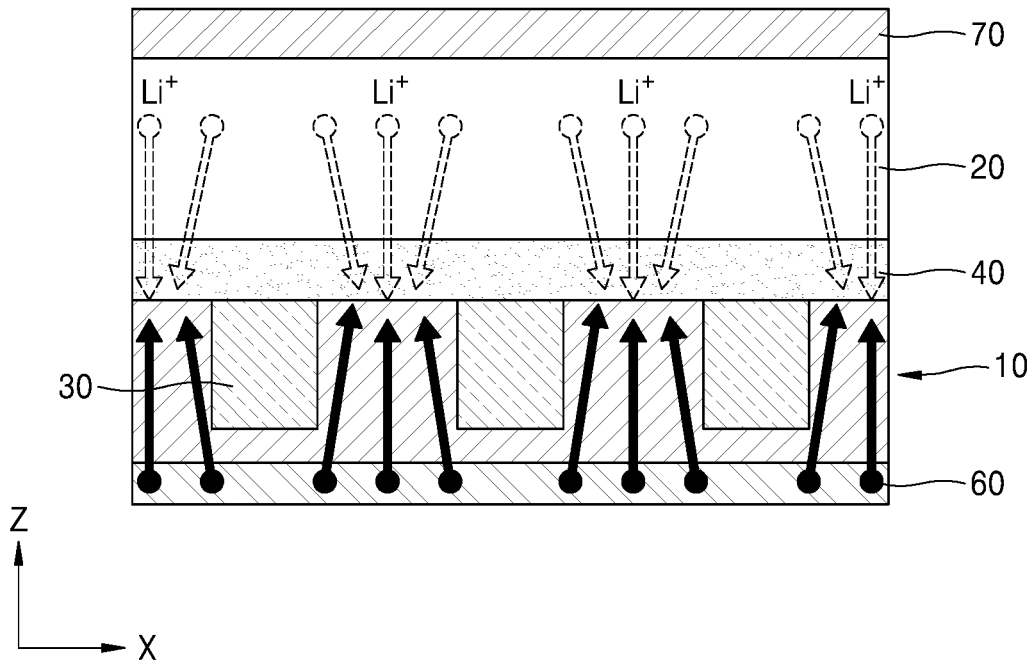
FIG. 4A is a cross-sectional view of a secondary battery illustrating the movement of lithium ions (Li+) and electrons (e−) during initial discharging of a lithium secondary battery manufactured according to a comparative example.
Figure 4B:
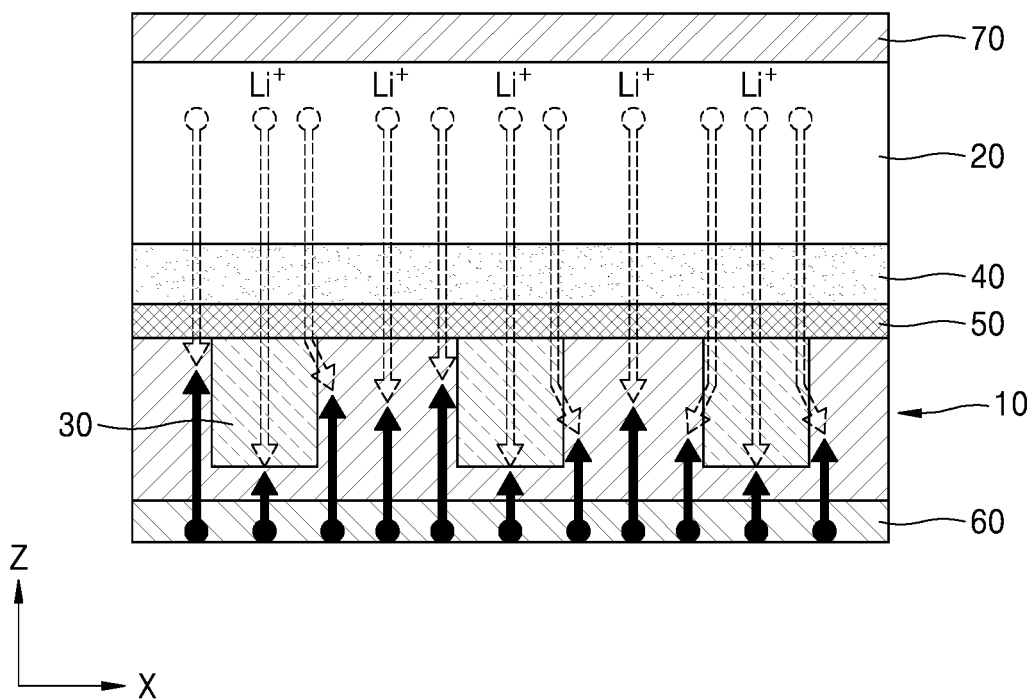
FIG. 4B is a cross-sectional view of a secondary battery illustrating the movement of lithium ions (Li+) and electrons (e−) during initial discharging of a lithium secondary battery manufactured according to an embodiment.

FIG. 3A is a cross-sectional view of a secondary battery showing the movement of lithium ions (Li$^+$) and electrons (e$^-$) during initial charging of a secondary battery manufactured according to a comparative example. FIG. 3B is a cross-sectional view of a secondary battery showing the movement of lithium ions (Li$^+$) and electrons (e$^-$) during initial charging of a secondary battery manufactured according to an embodiment. FIG. 4A is a cross-sectional view of a secondary battery showing the movement of lithium ions (Li$^+$) and electrons (e$^-$) during initial discharging of a secondary battery manufactured according to a comparative example. FIG. 4B is a cross-sectional view of a secondary battery showing the movement of lithium ions (Li$^+$) and electrons (e$^-$) during initial discharging of a secondary battery manufactured according to an embodiment.

Referring to FIG. 3A, when charging is performed by applying a voltage higher than a certain level to the secondary battery according to the comparative example, lithium ions (Li$^+$) may be desorbed from the positive active material included in the positive electrode 10, pass through the separation membrane 40, and move toward the negative electrode current collecting layer 70. At this time, lithium ions (Li$^+$) desorbed from the positive electrode 10 may be concentrated in a defined/limited area as they move to the side including the negative electrode current collecting layer 70.

On the other hand, referring to FIG. 3B, when charging is performed by applying a voltage higher than a certain level to the secondary battery according to an embodiment, lithium ions (Li$^+$) may be desorbed from the positive electrode active material included in the positive electrode 10, pass through the separation membrane 40 and the first metal layer 50, and move toward the negative electrode current collecting layer 70. At this time, the first metal layer 50 may perform the same function as a seed of lithium ions (Li$^+$). Accordingly, when the lithium ions (Li$^+$) desorbed from the positive electrode 10 pass through the separation membrane 40 and the first metal layer 50, the lithium ions (Li$^+$) may not be concentrated in a defined or limited area, and instead are evenly distributed as they moved to the side including the negative electrode current collecting layer 70.

Referring to FIG. 4A, when discharging is performed at a voltage higher than a certain level in the secondary battery according to the comparative example, lithium ions (Li$^+$) may be desorbed from the negative electrode active material included in the negative electrode 20, pass through the separation membrane 40, and move toward the side including the positive electrode current collecting layer 60. At this time, electrons (e$^-$) may move from the side of the positive electrode current collecting layer 60 toward the separation membrane 40. When the positive electrode 10 has the three-dimensional structure, the path through which the electrons (e$^-$) travel may be divided into a first region, where ends of the plurality of positive electrode plates 100 and the separation membrane 40 directly contact each other, and a second region, where the electrolyte material 30 and the separation membrane 40 are in direct contact with each other. The electrons (e−) thus may be concentrated in the first region, where ends of the plurality of positive electrode plates 100 and the separation membrane 40 directly contact each other. Accordingly, lithium ions (Li$^+$) may also be concentrated in the first region where ends of the plurality of positive electrode plates 100 and the separation membrane 40 directly contact each other.

As lithium ions (Li$^+$) and electrons (e$^-$) are concentrated in a partial region, current may be concentrated in a defined (limited) region, thereby deteriorating the rate capability of the secondary battery. In addition, when lithium ions (Li$^+$) are concentrated in a localized region due to current concentration, dendrites may be formed, and thus a life of the secondary battery may be reduced.

On the other hand, referring to FIG. 4B, when discharging is performed at a voltage higher than a certain level to the secondary battery according to an embodiment, lithium ions (Li$^+$) may be desorbed from the negative electrode active material included in the negative electrode 20, pass through the separation membrane 40, and move toward the side of the positive electrode current collecting layer 60. At the same time, electrons (e$^-$) may move from the side of the positive electrode current collecting layer 60 toward the separation membrane 40. Since the first metal layer 50 is disposed on a surface of the separation membrane 40, electrons (e$^-$) may be relatively uniformly distributed along the surface of the first metal layer 50. Accordingly, lithium ions (Li$^+$) may also be uniformly distributed along the surface of the first metal layer 50.

Without being limited by theory, it is understood that since the lithium ions (Li+) and electrons (e−) are uniformly distributed along the surface of the first metal layer 50, the phenomenon in which the current is concentrated may be alleviated, thereby preventing the decrease in the rate capability of the secondary battery. In addition, dendrites that may be formed due to current concentration, and a reduction in the life of the secondary battery, may also be prevented.

Figure 5:
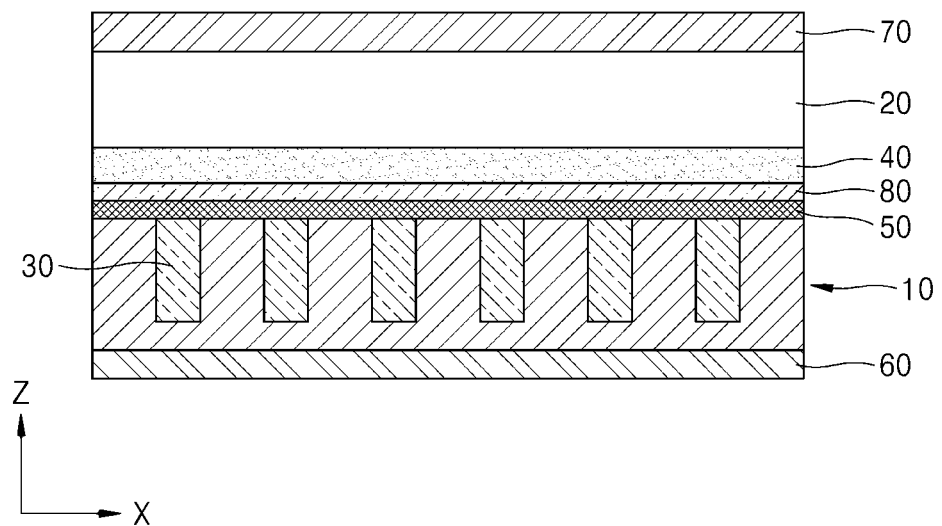
FIG. 5 is a cross-sectional view of a secondary battery, according to another embodiment.

When the first metal layer 50 is disposed between the positive electrode 10 and the separation membrane 40, a material contained in the first metal layer 50 may pass through the separation membrane 40 and may be transferred to the negative electrode 20. In order to prevent this phenomenon from occurring, a protective layer 80 may be additionally disposed between the separation membrane 40 and the first metal layer 50 as illustrated in FIG. 5.

The protective layer 80 may be disposed between the separation membrane 40 and the first metal layer 50 so that it prevents a material contained in the first metal layer 50 from being passed through the separation membrane 40 and transferred to the negative electrode 20. In an embodiment, the protective layer 80 may be deposited on a surface of the first metal layer 50. In addition, the protective layer 80 may include a materials through which lithium ions may pass, for example, aluminum (Al), silicon (Si), titanium (Ti), zirconium (Zr), tin (Sn), magnesium (Mg), calcium (Ca), or—a combination thereof, but the present disclosure is not limited thereto.

Figure 6A:
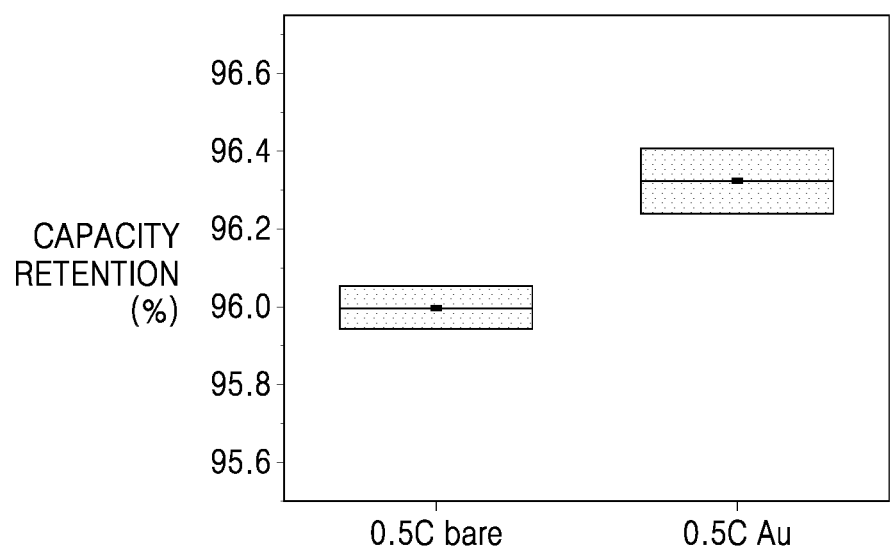
FIG. 6A is a graph of capacity retention (percent, %), which shows the capacity retention characteristics at 0.5 C for the secondary batteries according to Embodiment 1 and Comparative Example 1.
Figure 6B:
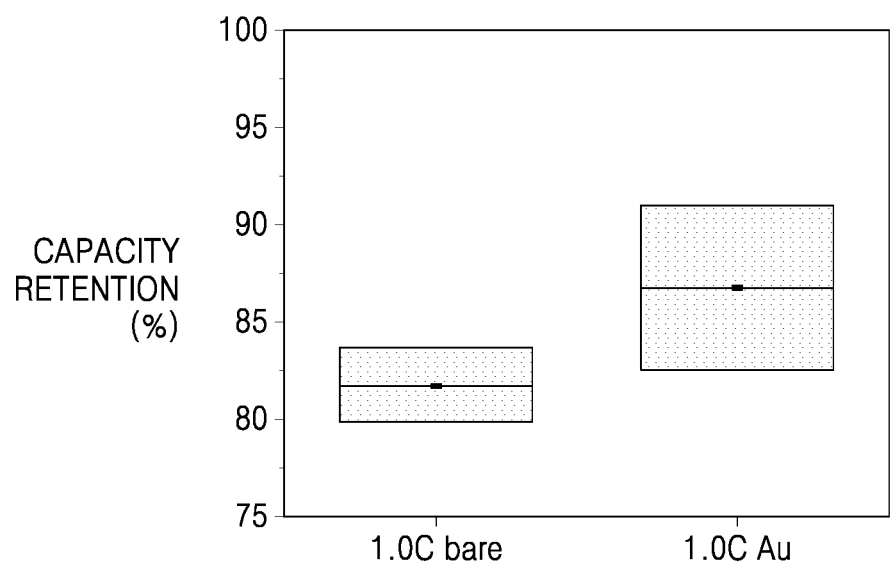
FIG. 6B is a graph showing capacity retention (%), which shows the capacity retention characteristics at 1.0 C for the secondary batteries according to Embodiment 1 and Comparative Example 1.
Figure 7:
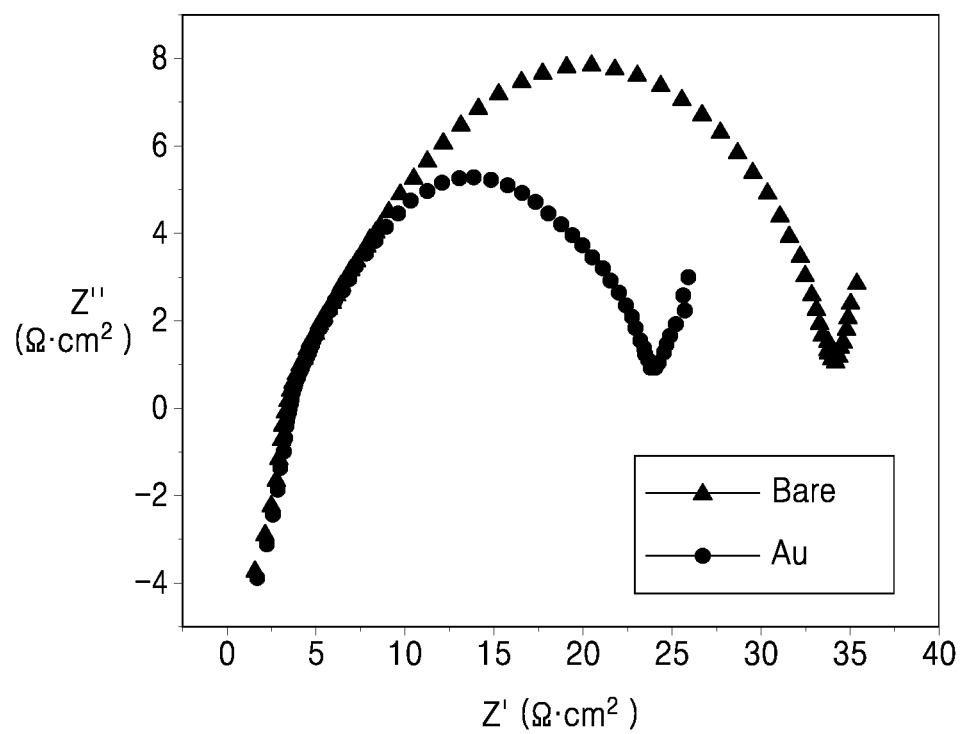
FIG. 7 is a Nyquist plot of the imaginary portion of the impedance Z" (ohm square centimeter, $\Omega\cdot cm^2$) versus the resistive portion of the impedance Z' ($\Omega\cdot cm^2$) of the secondary batteries according to Embodiment 1 and Comparative Example 1.

FIGS. 6A and 6B are graphs showing the capacity retention characteristics of the secondary batteries of Embodiment 1 and Comparative Example 1. FIG. 7 is a Nyquist plot of the secondary batteries of Embodiment 1 and Comparative Example 1.

Embodiment 1 and Comparative Example 1 are described.

Embodiment 1

In positive electrode 10 according to Embodiment 1, the channel C may be formed between the plurality of positive electrode plate layers 100 by performing a blade stamping process on an active material film including $LiCoO_2$ (LCO) as the positive electrode active material. The base layer 110 and the plurality of positive electrode plates 100 may be formed by performing a sintering process after the blade stamping process. The sintering process may include heat-treating the base layer 110 and the plurality of positive electrode plates 100 at a temperature of about 1,025° C. for about 2 hours.

Regarding the negative electrode 20 according to Embodiment 1, an negative active material composition (slurry) may be prepared by mixing a combination of a graphite negative electrode having a reversible capacity of 360 milliampere hours per gram (mAh/g), carbon black, and a polyvinylidene fluoride binder in a N-methyl-pyrrolidone (NMP) solution. The negative electrode active material slurry may be coated on a Cu foil and dried to prepare the negative electrode.

The electrolyte material 30 may be formed by dissolving $LiPF_6$ at a concentration of 1.0 molar (M) as a lithium salt in an organic solvent including a mixture of fluoroethylene carbonate:ethylene carbonate:ethylmethyl carbonate:dimethyl carbonate in a volume ratio of 7:7:46:40. Thereafter, the electrolyte material 30 may be injected into the channel C.

A polyethylene separation membrane 40 may be interposed between the positive electrode 10 and the negative electrode 20. The separation membrane 40 may separate the positive electrode 10 and the negative electrode 20 and provide the movement path for lithium ions, and is any separation membrane suitable for use in the lithium secondary battery. That is, any separation membrane 40 having low resistance to ion movement in the electrolyte and having excellent electrolyte-moisturizing ability may be used. For example, the separation membrane 40 may include glass fiber, polyester, polyethylene (PE), polypropylene (PP), polytetrafluoroethylene (PTFE), or a combination thereof. The separation membrane 40 may be in the form of a non-woven fabric or a woven fabric.

The first metal layer 50 may be a thin metal film containing gold (Au), and may be formed by a coating method including, for example, a spray coating or a vapor deposition method such as thermal evaporation. The thin metal film may have, for example, a thickness of about 5 nm to about 500 nm, and may be formed by the coating method on one side of the separation membrane to form first metal layer between the separation membrane and the positive electrode active material layer.

The positive electrode current collecting layer 60 may include copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), lead (Pd), or a combination thereof.

The negative electrode current collecting layer 70 may include the copper foil, the nickel foil, the stainless steel foil, the titanium foil, the nickel foam, the copper foam, the polymer substrate coated with the conductive metal, or a combination thereof.

Comparative Example 1

Comparative Example 1 is the same as Embodiment 1 except that the first metal layer 50 is not disposed between the positive electrode 10 and the separation membrane 40.

Referring to FIG. 6A, when comparing the capacity retention at 0.5 C relative to 0.1 C of the secondary battery according to Embodiment 1 and the secondary battery according to Comparative Example 1, when the first metal layer 50 is present (Embodiment 1), the capacity retention increases by about 0.3%, i.e., from 96.0% to 96.3%. In addition, when comparing the capacity retention at 1.0 C relative to 0.1 C (FIG. 6B) of the secondary battery according to Embodiment 1 and the secondary battery according to Comparative Example 1, when the first metal layer 50 is present, the capacity retention is increased by about 5.0%, i.e., from 81.9% to 86.9%. As described above, and without being limited by theory, it is understood that when the first metal layer 50 is disposed between the positive electrode 10 and the separation membrane 40, lithium ions (Li+) and electrons (e−) are uniformly transferred along a surface of the first metal layer 50, and thus the capacity retention is improved. In addition, as the discharge rate (C-rate) increases, it was found that when the first metal layer 50 is disposed, the capacity retention is improved.

Referring to FIG. 7, the size of an arc in the Nyquist plot, which indicates charge transfer in the Nyquist plot, is smaller for the secondary battery of Embodiment 1, in which the first metal layer 50 is present, than the secondary battery of Comparative Example 1. From this, it is understood that the electrical resistance of the secondary battery of Embodiment 1, in which the first metal layer 50 is disposed between the positive electrode 10 and the separation membrane 40, is reduced.

Figure 8:
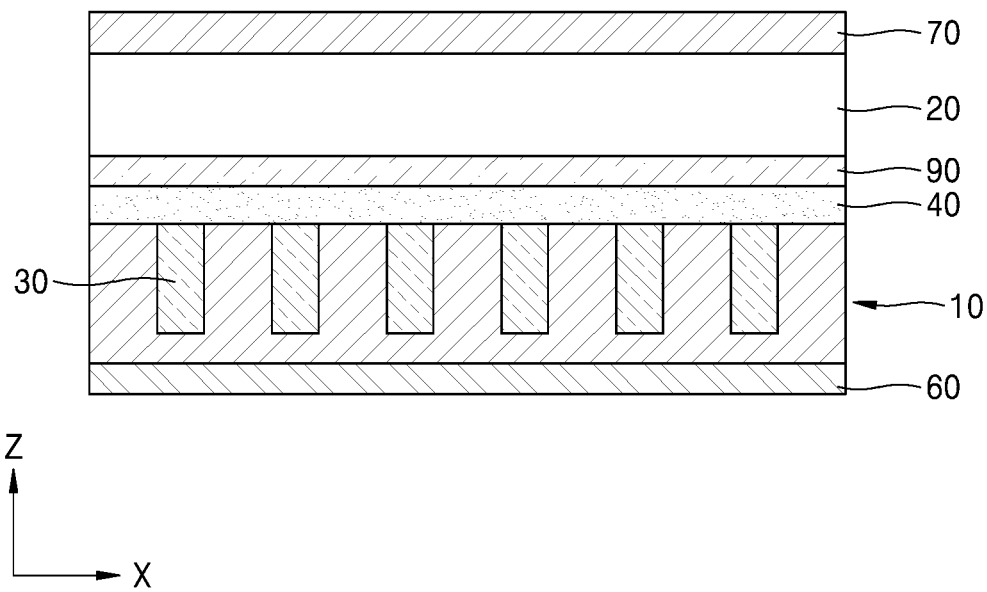
FIG. 8 is a cross-sectional view of a secondary battery, according to another embodiment.
Figure 9:
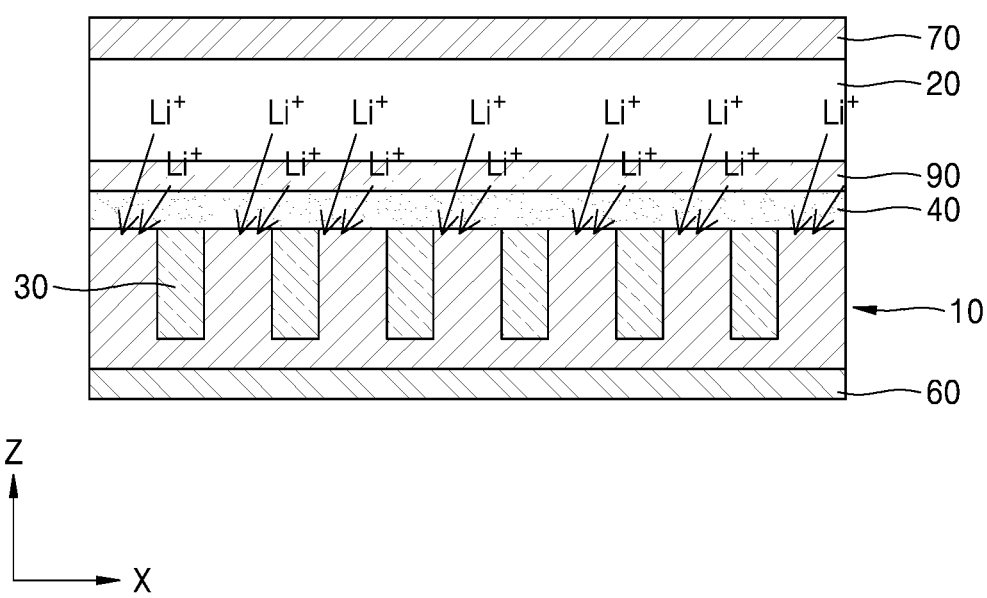
FIG. 9 is a cross-sectional view of a secondary battery illustrating a movement path of lithium ions during discharge in the secondary battery illustrated in FIG. 8.

FIG. 8 is a cross-sectional view of a secondary battery according to another embodiment. FIG. 9 is a cross-sectional view of a secondary battery showing a movement path of lithium ions during discharge in the secondary battery illustrated in FIG. 8.

Referring to FIGS. 8 and 9, the secondary battery 1 according to an embodiment, may include the positive electrode 10, the negative electrode 20, the electrolyte material 30, the separation membrane 40 disposed between the positive electrode 10 and the negative electrode 20, the positive electrode current collecting layer 60, the negative electrode current collecting layer 70, and a (second) metal layer 90. The details related to the positive electrode 10, the negative electrode 20, the electrolyte material 30, the separation membrane 40, the positive electrode current collecting layer 60, and the negative electrode current collecting layer 70 are substantially the same as the configuration shown in FIGS. 1 and 2A.

The second metal layer 90 may be disposed on a surface of the separation membrane 40 that faces the negative electrode 20. The second metal layer 90, according to an embodiment, may be deposited on the surface of the separation membrane 40 using a deposition process, for example, a thermal evaporation method. However, the present disclosure is not limited thereto, and any process in which the second metal layer 90 may be disposed on the surface of the separation membrane 40 may be used.

In addition, the second metal layer 90 may include a metal capable of providing metal ions, for example, lithium ions.

In an embodiment, the second metal layer 90 may include a lithium metal having a thin film shape. In addition, the second metal layer 90 may have a predetermined thickness in which the conductivity of metal ions is not reduced. For example, the second metal layer 90 may have a thickness of about 50 nm to about 10 µm, or about 100 nm to about 7.5 µm, or about 1 µm to about 10 µm, but the present disclosure is not limited thereto.

The second metal layer 90 disposed on the surface of the separation membrane 40 may contact the negative electrode 20. Accordingly, metal ions, for example lithium ions, moving between the positive electrode 10 and the negative electrode 20 may be uniformly dispersed and moved along the second metal layer 90. Accordingly, uniform distribution of the current may be achieved thereby preventing deterioration in the rate capability. In addition, when lithium ions (Li+) transferred from the positive electrode 10 to the negative electrode 20 are irreversibly combined during a charging process of the secondary battery 1, according to an embodiment, and thus are not recovered to the positive electrode 10 during a discharging process, as illustrated in FIG. 9, the second metal layer 90 may be used as an additional source of lithium ions (Li+) that may compensate for and provide unrecovered lithium ions (Li+).

As described above, as lithium ions (Li+) are uniformly transferred along a surface of the second metal layer 90, the phenomenon of current concentration may be alleviated, and the formation of dendrites due to current concentration as well as the accompanying reduction in the lifetime of the secondary battery, may be prevented. In addition, the second metal layer 90 may be used as an additional source of lithium ions (Li+) thereby compensating for any loss of lithium ions (Li+), and preventing a decrease in capacity efficiency characteristics.

Figure 10A:
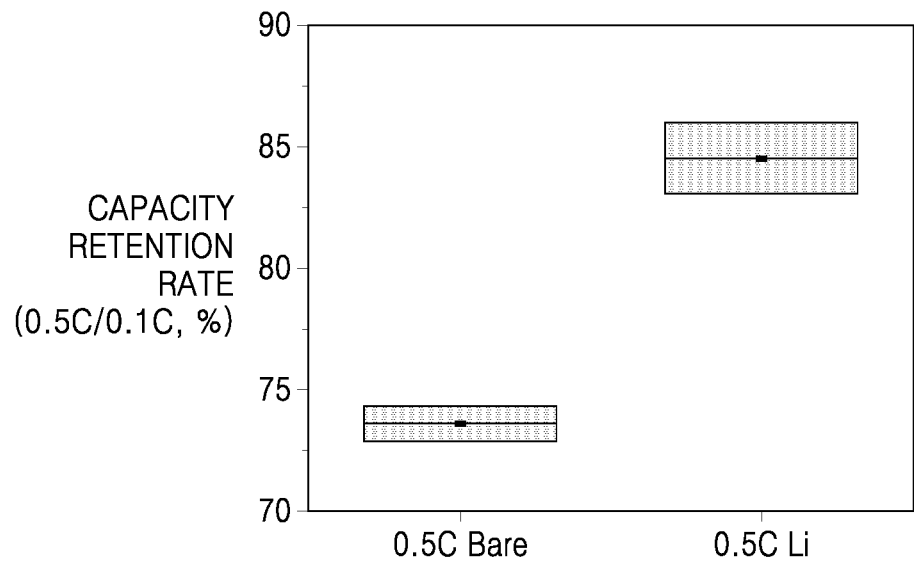
FIG. 10A is a graph of capacity retention (%), which shows the capacity retention characteristics at 0.5 C for the secondary batteries according to Embodiment Example 2 and Comparative Example 2.
Figure 10B:
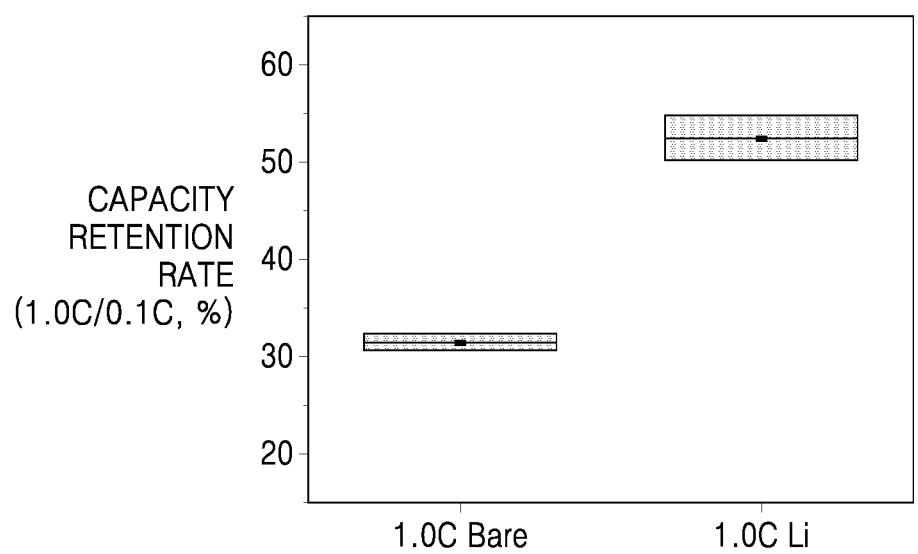
FIG. 10B is a graph of capacity retention (%), which shows the capacity retention characteristics at 1.0 C for the secondary batteries according to Embodiment 1 and Comparative Example 1.

FIGS. 10A and 10B are graphs showing the capacity retention characteristics of the secondary batteries according to Embodiment 2 and Comparative Example 2.

Embodiment 2 and Comparative Example 2 are described below.

Embodiment 2

Except the negative electrode 20 and the second metal layer 90, the details related to the positive electrode 10, the electrolyte material 30, the separation membrane 40, the positive electrode current collecting layer 60 and the negative electrode current collecting layer 70 are the same as those in Embodiment 1. In the negative electrode 20 according to Embodiment 2, an negative active material slurry may be prepared by mixing a combination of a silicon-carbon composite having a reversible capacity of 1,000 mAh/g, graphite, and a polyacrylic acid binder in water. The negative electrode active material slurry may be coated on the Cu foil and dried to prepare the negative electrode 20.

The second metal layer 90 may be a lithium (Li) metal thin film and may be formed by a vapor deposition method such as sputtering or thermal evaporation. The second metal layer 90 has a thickness of about 50 nm to about 10 µm, and is formed on one surface of the separation membrane 40 through the deposition methods so that the second metal layer 90 is formed between the separation membrane 40 and the negative electrode 20.

Comparative Example 2

Comparative Example 2 is the same as Embodiment 2 except that the second metal layer 90 is not disposed between the negative electrode 10 and the separation membrane 40.

Referring to FIG. 10A, when comparing the capacity retention at 0.5 C relative to 0.1 C of the secondary battery according to Embodiment 2 and the secondary battery according to Comparative Example 2, when the second metal layer 90 is present (Embodiment 2), the capacity retention is increased by about 12%, i.e., from 73.0% to 85.0%. In addition, when comparing the capacity retention at 1.0 C relative to 0.1 C (FIG. 10B) of the secondary battery according to Embodiment 2 and the secondary battery according to Comparative Example 2, when the second metal layer 90 is present, the capacity retention is increased by about 21.0%, i.e., from 32.0% to 53.0%. As described above, when the second metal layer 90 is disposed between the negative electrode 20 and the separation membrane 40, the capacity retention is improved. In addition, as the discharge rate (C-rate) increases, and when the second metal layer 90 is present, the capacity retention is improved.

The second metal layer 90 and the first metal layer 50 described above may be present separately in the secondary battery 1 according to an embodiment (i.e., only one of the second metal layer 90 and the first metal layer 50 is present). Alternatively, both the second metal layer 90 and the first metal layer 50 may be present.

Figure 11:
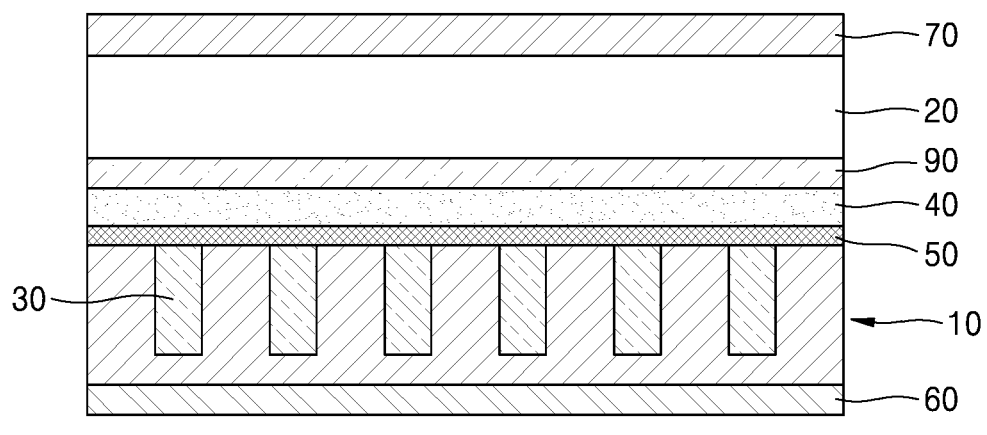
FIG. 11 is a cross-sectional view of a secondary battery, according to another embodiment.
Figure 11:
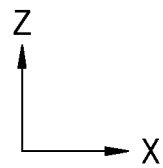
Figure 12A:
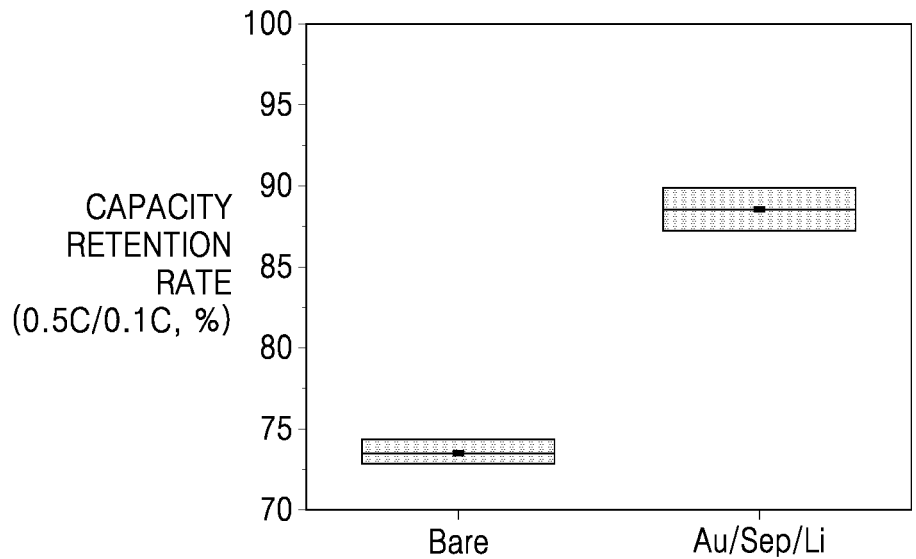
FIG. 12A is a graph of capacity retention (percent, %) versus test sample, which shows the capacity retention characteristics of the secondary batteries according to Embodiment Example 3 and Comparative Example 3.
Figure 12B:
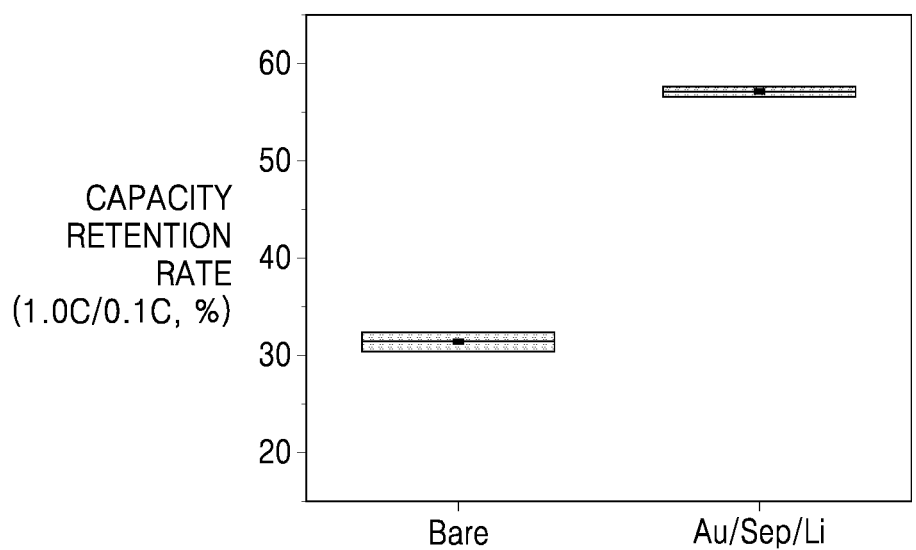
FIG. 12B is a graph of capacity retention (%), which shows the capacity retention characteristics of the secondary batteries according to Embodiment 1 and Comparative Example 1.

FIG. 11 is a cross-sectional view of a secondary battery according to another embodiment. FIGS. 12A and 12B are graphs illustrating the capacity retention characteristics of the secondary batteries according to Embodiment 3 and Comparative Example 3.

Referring to FIG. 11, the secondary battery 1 according to an embodiment may include the positive electrode 10, the negative electrode 20, the electrolyte material 30, the separation membrane 40 disposed between the positive electrode 10 and the negative electrode 20, the first metal layer 50, the positive electrode current collecting layer 60, the negative electrode current collecting layer 70, and the second metal layer 90. The details related to the positive electrode 10, the negative electrode 20, the electrolyte material 30, the separation membrane 40, the first metal layer 50, the positive electrode current collecting layer 60 and the negative electrode current collecting layer 70 are substantially the same as the configuration shown in FIGS. 1 and 2A, and the details related to the second metal layer 90 are substantially the same as those shown in FIG. 8, and thus a description thereof will be omitted.

As described above, and without being limited by theory, as lithium ions (Li+) or electrons (e−) are uniformly transferred along a surface of the first metal layer 50 and the second metal layer 90, the phenomenon of current concentration may be alleviated, so that any dendrites formed due to the current concentration and a corresponding decrease in the life of the secondary battery associated therewith, may be prevented. In addition, the second metal layer 90 may be used as the additional source of lithium ions (Li+) that may be provided by compensating for lithium ions (Li+), thereby preventing a decrease in capacity efficiency characteristics.

Embodiment 3 and Comparative Example 3 are described below.

Embodiment 3

Except for the second metal layer 90, the details related to the positive electrode 10, the electrolyte material 30, the separation membrane 40, the first metal layer 50, the positive electrode current collecting layer 60 and the negative electrode current collecting layer 70 are the same as those in Embodiment 1. In the negative electrode 20 according to Embodiment 2, an active material slurry may be prepared by mixing a combination of a silicon-carbon composite having the reversible capacity of 1,000 mAh/g, graphite, and a polyacrylic acid binder in water. The negative electrode active material slurry may be coated on the Cu foil and dried to prepare the negative electrode 20.

The second metal layer 90 may be a lithium (Li) metal thin film and may be formed by various vapor deposition methods such as sputtering or thermal evaporation. The second metal layer 90 has a thickness of about 50 nm to about 10 μm may be formed on a surface of the separation membrane 40 through a deposition method so that the second metal layer 90 is formed between the separation membrane 40 and the negative electrode 20.

Comparative Example 3

With the exception that the first metal layer 50 is not disposed between the positive electrode 10 and the separation membrane 40, and the second metal layer 90 is not disposed between the negative electrode 20 and the separation membrane 40, the details are the same as in Example 3.

Referring to FIG. 12A, when comparing the capacity retention at 0.5 C relative to 0.1 C of the secondary battery according to Embodiment 3 and the secondary battery according to Comparative Example 3, when the first metal layer 50 and the second metal layer 90 are present, the capacity retention is increased by about 15%, i.e., from 73.0% to 88.0%. In addition, when comparing the capacity of 1.0 C compared to 0.1 C (FIG. 12B) of the secondary battery according to Embodiment 3 and the secondary battery according to Comparative Example 3, when the first metal layer 50 and the second metal layer 90 are present, the capacity retention is increased by about 27.0%, i.e., from 32.0% to 59.0%. As described above, when the first metal layer 50 and the second metal layer 90 are disposed at the same time, the capacity retention is improved compared to the case where only the first metal layer 50 or the second metal layer 90 are disposed (i.e., only the first metal layer or only the second metal layer are present). In addition, as the discharge rate (C-rate) increases, and when the first metal layer 50 and the second metal layer 90 are disposed, the capacity retention is improved.

Although many details are described in the above description, they should be construed as examples of specific embodiments, and without limiting the scope of the present disclosure. For example, those of ordinary skill in the art to which the present disclosure pertains will recognize that the structure of the secondary battery according to an embodiment may be variously modified. Therefore, the scope of the present disclosure should not be limited to the described embodiments.

According to an aspect, in the secondary battery including a positive electrode layer having the three-dimensional shape, the uniform movement of lithium ions and electrons may be implemented.

In addition, provided is a secondary battery having improved rate capability with an increase in capacity.

In addition, the secondary battery has an improved lifespan due to prevention in deterioration of the secondary battery.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A secondary battery comprising:
   a negative electrode;
   a positive electrode comprising
      a plurality of positive electrode plates spaced apart from each other in a width direction, wherein a positive electrode plate of the plurality of positive electrode plates has a planar shape, and
      a channel between the plurality of positive electrode plates;
   an electrolyte material disposed in the channel between the plurality of positive electrode plates;
   a separation membrane between the negative electrode and the positive electrode;
   a first metal layer on a surface of the separation membrane facing the positive electrode; and
   a protective layer between the separation membrane and the first metal layer, wherein the protective layer comprises a metallic Al, Si, Ti, Zr, Sn, Mg, Ca, or a combination thereof.

2. The secondary battery of claim 1, wherein the first metal layer comprises aluminum, nickel, copper, silver, zinc, tin, gold, poly (3,4-ethylenedioxythiophene):poly (styrene sulfonate), polyaniline, polypyrrole, polythiophene functionalized with a carboxylate-containing polymer, or a combination thereof.

3. The secondary battery of claim 1, wherein the first metal layer has a thickness of about 5 nanometers to about 500 nanometers.

4. The secondary battery of claim 1, wherein the positive electrode further comprises
   a base layer to which a first end of each positive electrode plate of the plurality of positive electrode plates is attached, and
   wherein the plurality of positive electrode plates are spaced apart from each other at a predetermined interval on an upper surface of the base layer.

5. The secondary battery of claim 4, wherein the base layer comprises a first positive active material, and the plurality of positive electrode plates comprises a second positive active material.

6. The secondary battery of claim 5, wherein the first active positive material and the second positive active material are the same or different.

7. The secondary battery of claim 4, further comprising:
   a positive electrode current collecting layer disposed to face a surface of the base layer; and
   a negative electrode current collecting layer facing a surface of the negative electrode and facing the positive electrode current collecting layer.

8. The secondary battery of claim 7, wherein the second end of each positive electrode plate of the plurality of positive electrode plates is not attached to the base plate.

9. The secondary battery of claim 1, wherein the plurality of positive electrode plates comprises a porous structure having a plurality of pores.

10. The secondary battery of claim 1, wherein the plurality of positive electrode plates comprises $LiCoO_2$, $Li(Ni,Co,Mn)O_2$, $Li(Ni,Co,Al)O_2$, $LiMn_2O_4$, $LiFePO_4$, or a combination thereof.

11. A secondary battery, comprising:
a negative electrode;
a positive electrode comprising
   a plurality of positive electrode plates spaced apart from each other in a width direction, wherein a positive electrode plate of the plurality of positive electrode plates has a planar shape, and
   a channel between the plurality of positive electrode plates;
an electrolyte material disposed in the channel between the plurality of positive electrode plates;
a separation membrane between the negative electrode and the positive electrode;
a first metal layer on a surface of the separation membrane facing the positive electrode;
a second metal layer between the negative electrode and the separation membrane; and
a protective layer between the separation membrane and the first metal layer, wherein the protective layer comprises a metallic Al, Si, Ti, Zr, Sn, Mg, Ca, or a combination thereof.

12. The secondary battery of claim 11, wherein the second metal layer comprises a lithium metal and has a film shape.

13. The secondary battery of claim 11, wherein the second metal layer has a thickness of about 50 nanometers to about 10 micrometers.

14. The secondary battery of claim 11, wherein the first metal layer comprises one or more of aluminum, nickel, copper, silver, zinc, tin, gold, poly (3,4-ethylenedioxythiophene):poly (styrene sulfonate), polyaniline, polypyrrole, polythiophene functionalized with a carboxylate-containing polymer, or a combination thereof.

15. The secondary battery of claim 11, wherein the first metal layer has a thickness of about 5 nanometers to about 500 nanometers.

16. The secondary battery of claim 11, wherein the positive electrode further comprises
   a base layer to which a first end of each positive electrode plate of the plurality of positive electrode plates is attached,
   wherein the plurality of positive electrode plates are spaced apart from each other at a predetermined interval on an upper surface of the base layer.

17. The secondary battery of claim 16, wherein the base layer comprises a first positive active material, and the plurality of positive electrode plates comprises a second positive active material.

18. The secondary battery of claim 17, wherein the first positive active material and the second positive active material are the same or different.

19. The secondary battery of claim 16, further comprising:
   a positive electrode current collecting layer disposed to face a surface of the based layer; and
   a negative electrode current collecting layer facing a surface of the negative electrode and facing the positive electrode current collecting layer.

20. The secondary battery of claim 11, wherein the plurality of positive electrode plates comprises a porous structure having a plurality of pores therein.

21. The secondary battery of claim 11, wherein the plurality of positive electrode plates comprises $LiCoO_2$, $Li[Ni,Co,Mn]O_2$, $Li[Ni,Co,Al]O_2$, $LiMn_2O_4$, $LiFePO_4$, or a combination thereof.

22. A secondary battery comprising:
a negative electrode;
a positive electrode comprising
   a plurality of positive electrode plates spaced apart from each other in a width direction, wherein a positive electrode plate of the plurality of positive electrode plates has a planar shape;
an electrolyte material between the plurality of positive electrode plates;
a separation membrane between the negative electrode and the plurality of positive electrode plates; and
a metal layer between the negative electrode and the separation membrane, wherein the metal layer is a metallic lithium having a film shape.

23. The secondary battery of claim 22, wherein the metal layer has a thickness of about 50 nanometers to about 10 micrometers or less.

24. The secondary battery of claim 22, wherein the positive electrode further comprises
   a base layer to which a first end of each positive electrode plate of the plurality of positive electrode plates is attached, and
   wherein the plurality of positive electrode plates are spaced apart from each other at a predetermined interval on an upper surface of the base layer.

25. The secondary battery of claim 24, wherein the base layer comprises a first positive active material, and the plurality of positive electrode plates comprises a second positive active material.

26. The secondary battery of claim 25, wherein the first positive active material and the second positive active material are the same or different.

27. The secondary battery of claim 24, further comprising
   a positive electrode current collecting layer disposed to face a surface of the based layer; and
   a negative electrode current collecting layer facing a surface of the negative electrode and facing the positive electrode current collecting layer.

28. The secondary battery of claim 22, wherein the plurality of positive electrode plates comprises a porous structure having a plurality of pores therein.

29. The secondary battery of claim 22, wherein the plurality of positive electrode plates comprises $LiCoO_2$, $Li[Ni,Co,Mn]O_2$, $Li[Ni,Co,Al]O_2$, $LiMn_2O_4$, $LiFePO_4$, or a combination thereof.

* * * * *